US008165551B2

(12) United States Patent
Chiu et al.

(10) Patent No.: US 8,165,551 B2
(45) Date of Patent: Apr. 24, 2012

(54) MULTI-BAND ANTENNA AND COMMUNICATIONS DEVICE HAVING THE SAME

(75) Inventors: Chieh-Ping Chiu, Tao Yuan Shien (TW); Feng-Jen Weng, Tao Yuan Shien (TW); Hsiao-Wei Wu, Zhongli (TW); I-Ping Yen, Yonghe (TW)

(73) Assignee: Quanta Computer Inc., Tao Yuan Shien (TW)

( * ) Notice: Subject to any disclaimer, the term of this patent is extended or adjusted under 35 U.S.C. 154(b) by 98 days.

(21) Appl. No.: 12/883,699

(22) Filed: Sep. 16, 2010

(65) Prior Publication Data

US 2011/0263217 A1 Oct. 27, 2011

(30) Foreign Application Priority Data

Apr. 26, 2010 (TW) ............................... 99113085 A

(51) Int. Cl.
*H04B 1/06* (2006.01)
*H04K 3/00* (2006.01)

(52) U.S. Cl. ................. 455/269; 455/129; 343/700 MS; 343/702

(58) Field of Classification Search .................. 455/129, 455/269, 280–282; 343/700 MS, 702
See application file for complete search history.

(56) References Cited

U.S. PATENT DOCUMENTS 3,229,298 A * 1/1966 Morgan ........................ 343/806
6,369,762 B1 * 4/2002 Yanagisawa et al. .. 343/700 MS
2007/0146221 A1 * 6/2007 Oshiyama et al. ............ 343/749
2009/0002243 A1 * 1/2009 Dahlstrom et al. ........... 343/702

* cited by examiner

*Primary Examiner* — Lee Nguyen
(74) *Attorney, Agent, or Firm* — Steptoe & Johnson LLP

(57) ABSTRACT

A multi-band antenna is adapted for disposing on a substrate with a ground plane and a matching circuit disposed thereon, and includes a feed-in section, a coupling section, a grounding section, a multiple-bend arm, and a conductor section. The feed-in section is connected electrically to the matching circuit. The coupling section is connected electrically to the feed-in section and is disposed spacedly from the ground plane. The grounding section is connected electrically to the ground plane. The multiple-bend arm is connected electrically to the coupling section and the grounding section and cooperates with the grounding section to form a signal path for signals in a first frequency band. The conductor section is connected electrically to the multiple-bend arm and cooperates with a portion of the multiple-bend arm to form a signal path for signals in a second frequency band.

19 Claims, 24 Drawing Sheets

MULTI-BAND ANTENNA AND COMMUNICATIONS DEVICE HAVING THE SAME

CROSS-REFERENCE TO RELATED APPLICATION

This application claims priority of Taiwanese Application No. 099113085, filed on Apr. 26, 2010.

BACKGROUND OF THE INVENTION

1. Field of the Invention

The present invention relates to a multi-band antenna and a communications device having the same, more particularly to a multi-band antenna with small dimensions suitable for application to a communications device.

2. Description of the Related Art

As one skilled in the art would know, generally, the frequency range within which an antenna is operable has a proportional relation to dimensions of the antenna. Currently, in addition to disposing in portable computers, antennas are also disposed in external Universal Serial Bus (USB) devices (e.g., USB dongles), which have relatively limited internal space.

Therefore, how to reduce dimensions of the antenna while ensuring that the antenna may operate in multiple frequency bands is a subject of improvement of the present invention.

SUMMARY OF THE INVENTION

Therefore, an object of the present invention is to provide a multi-band antenna with relatively small dimensions.

Accordingly, a multi-band antenna of the present invention is adapted for disposing on a substrate with a ground plane and a matching circuit disposed thereon. The multi-band antenna includes a radiator, which includes a feed-in section, a coupling section, a grounding section, a multiple-bend arm, and a conductor section.

The feed-in section is adapted to be connected electrically to the matching circuit. The coupling section is connected electrically to the feed-in section and is adapted to be disposed spacedly from the ground plane. The grounding section is adapted to be connected electrically to the ground plane. The multiple-bend arm is connected electrically to the coupling section and the grounding section, and cooperates with the grounding section to form a signal path for signals in a first frequency band. The conductor section is connected electrically to the multiple-bend arm and cooperates with a portion of the multiple-bend arm to form a signal path for signals in a second frequency band.

Another object of the present invention is to provide a communications device that includes a multi-band antenna with relatively small dimensions.

Accordingly, a communications device of the present invention, such as a USB wireless network card, includes a substrate with a ground plane and a matching circuit disposed thereon, and a multi-band antenna disposed on the substrate. The multi-band antenna includes a radiator, which includes a feed-in section, a coupling section, a grounding section, a multiple-bend arm, and a conductor section.

The feed-in section is connected electrically to the matching circuit. The coupling section is connected electrically to the feed-in section and is disposed spacedly from the ground plane. The grounding section is connected electrically to the ground plane. The multiple-bend arm is connected electrically to the coupling section and the grounding section, and cooperates with the grounding section to form a signal path for signals in a first frequency band. The conductor section is connected electrically to the multiple-bend arm and cooperates with a portion of the multiple-bend arm to form a signal path for signals in a second frequency band.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
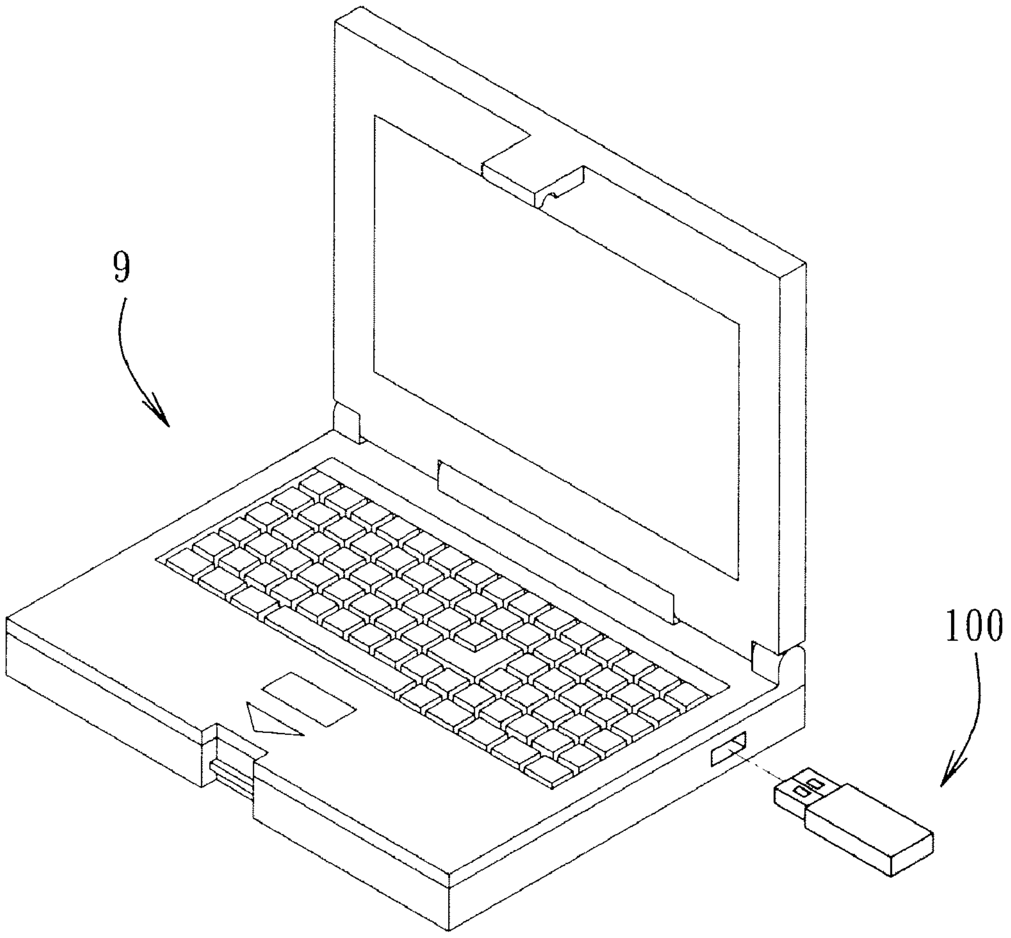
FIG. 1 is a perspective view showing a portable computer and the preferred embodiment of a Universal Serial Bus (USB) wireless network card according to this invention.

Referring to FIG. 1, the preferred embodiment of a communications device according to the present invention is embodied as a Universal Serial Bus (USB) wireless network card 100 that is adapted to be connected to a USB port of a portable computer 9 for providing Wireless Local Area Network (WLAN) and Worldwide Interoperability for Microwave Access (WIMAX) connectivity thereto.

Figure 2:
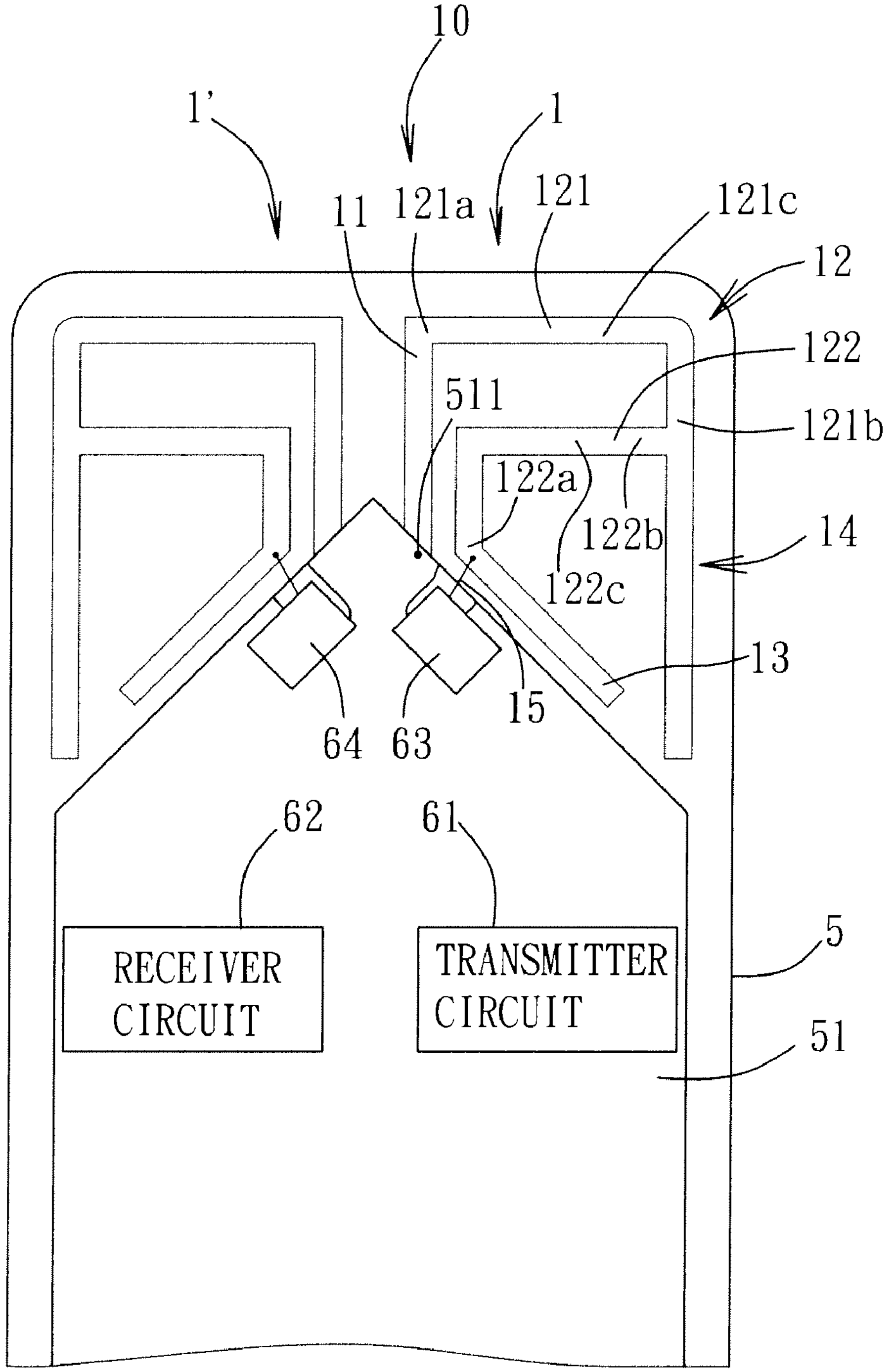
FIG. 2 is a schematic diagram illustrating a substrate with the preferred embodiment of a multi-band antenna of this invention disposed thereon, the substrate being disposed in the USB wireless network card.

Referring to FIG. 2, the USB wireless network card 100 includes a substrate 5 with a ground plane 51, a transmitter circuit 61, a receiver circuit 62, and first and second matching circuits 63, 64 disposed thereon. The ground plane 51 has a ground point 511 and is for connecting electrically to a ground plane of the portable computer 9. The USB wireless network card 100 further includes a multi-band antenna 10 disposed on the substrate 5, connected electrically to the transmitter circuit 61 and the receiver circuit 62, and including first and second radiators 1, 1'. The first radiator 1 is connected electrically to the first matching circuit 63 and the ground plane 51. The second radiator 1' is connected electrically to the second matching circuit 64 and the ground plane 51. Since the second radiator 1', which is spaced apart from the first radiator 1, is a mirror image of the first radiator 1, only the first radiator 1 will be described hereinafter for the sake of brevity.

The first radiator 1 includes an elongated grounding section 11, a multiple-bend arm 12, an elongated coupling section 13, an elongated conductor section 14, and a feed-in section 15.

The multiple-bend arm 12 includes substantially L-shaped first and second bent connecting sections 121, 122, each of which has a first end 121*a*, 122*a* and a second end 121*b*, 122*b* opposite to the first end 121*a*, 122*a*. The second ends 121*b*, 122*b* of the first and second bent connecting sections 121, 122 are connected electrically to each other. The first bent connecting section 121 has a first connecting segment 121*c*, and the second bent connecting section 122 has a second connecting segment 122*c* that is substantially parallel to the first connecting segment 121*c* and that is spaced apart from the first connecting segment 121*c*.

Figure 3:
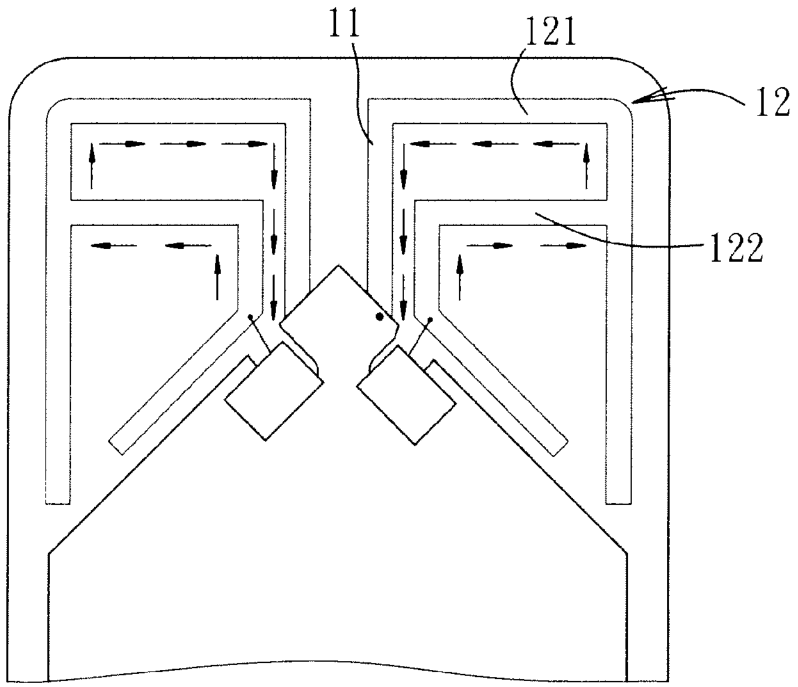
FIG. 3 is a schematic diagram illustrating a signal path of the multi-band antenna for signals in a first frequency band.

The grounding section 11 has a first end connected electrically to the ground plane 51, and a second end opposite to the first end and connected electrically to the first end 121*a* of the first bent connecting section 121. Referring to FIG. 3, the grounding section 11 cooperates with the first and second bent connecting sections 121, 122 to form a signal path for signals in a first frequency band 101, which, in the present embodiment, is the 3.5 GHz band.

Figure 4:
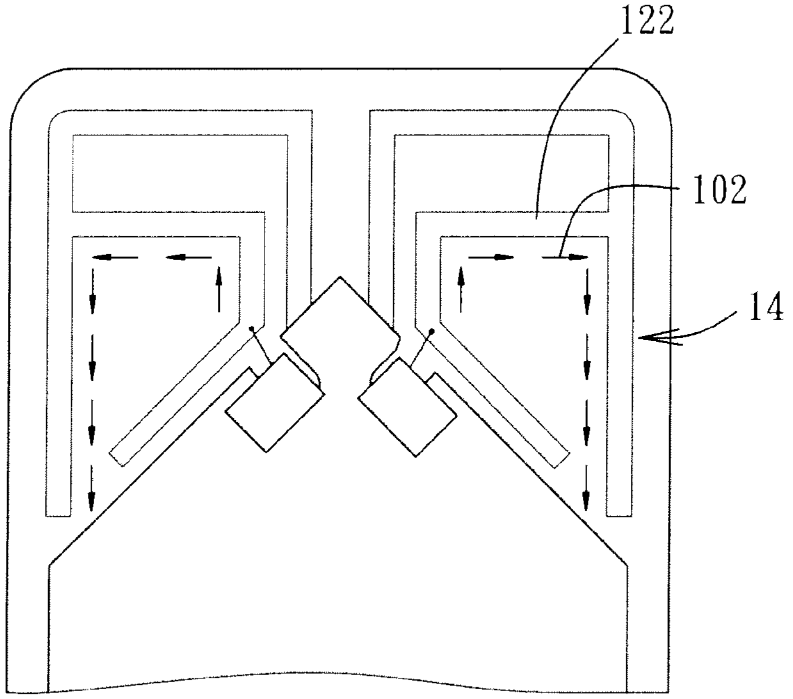
FIG. 4 is a schematic diagram illustrating a signal path of the multi-band antenna for signals in a second frequency band.

The conductor section 14 is connected electrically to a junction of the second ends 121*b*, 122*b* of the first and second bent connecting sections 121, 122. Referring to FIG. 4, the conductor section 14 cooperates with the second bent connecting section 122 to form a signal path for signals in a second frequency band 102, which, in the present embodiment, is the 2.5 GHz band.

The feed-in section 15 is connected electrically to the coupling section 13 and the first matching circuit 63. The coupling section 13 is disposed spacedly from the ground plane 51.

In the present embodiment, the grounding section 11, and the first and second bent connecting sections 121, 122 have a total length not longer than a quarter-wavelength of the lowest frequency, and not shorter than a quarter-wavelength of the highest frequency, within the first frequency band 101. The conductor section 14 and the second bent connecting section 122 have a total length not longer than a quarter-wavelength of the lowest frequency, and not shorter than a quarter-wavelength of the highest frequency, within the second frequency band 102.

Figure 5:
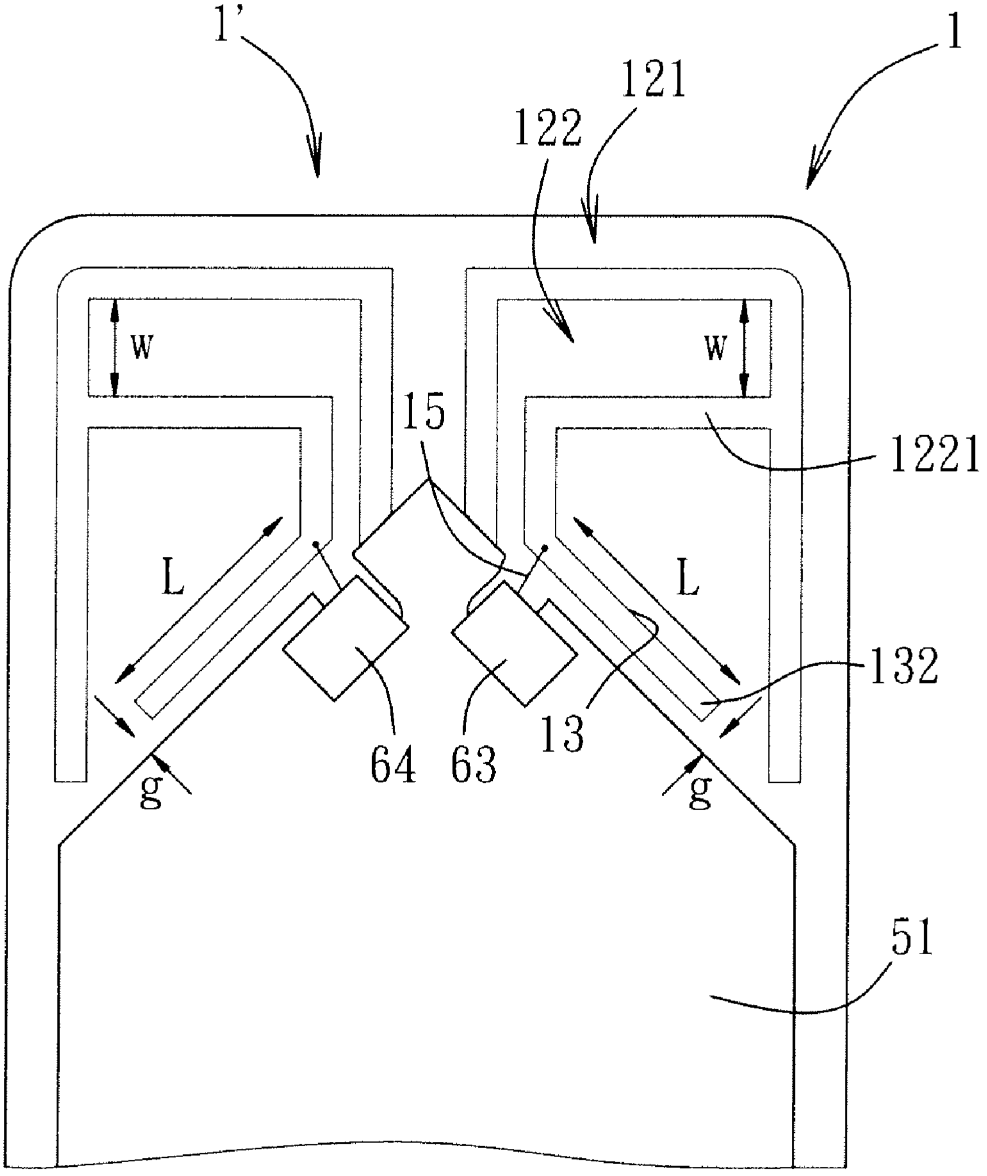
FIG. 5 is a schematic diagram illustrating distances among different sections of each of first and second radiators of the multi-band antenna upon which the first and second frequency bands are dependent.

Referring to FIG. 5, the first and second frequency bands 101, 102 are dependent upon a distance (W) between the first and second connecting segments 121*c*, 122*c*. The first and second frequency bands 101, 102 are further dependent upon a length (L) of the coupling section 13, and a distance (g) between the coupling section 13 and the ground plane 51. The distances (W, g) and the length (L) may be pre-selected in a manner that the first and second frequency bands 101, 102 partly overlap to form a wide frequency band. Furthermore, the first matching circuit 63 may be fine-tuned to optimize impedance matching of the first radiator 1.

In the present embodiment, the transmitter circuit 61 is configured for modulating to-be-transmitted signals onto a carrier wave having a frequency in at least one of the first and second frequency bands 101, 102. The receiver circuit 62 is configured for demodulating received signals with a carrier wave having a frequency in either of the first and second frequency bands 101, 102.

Figure 6A:
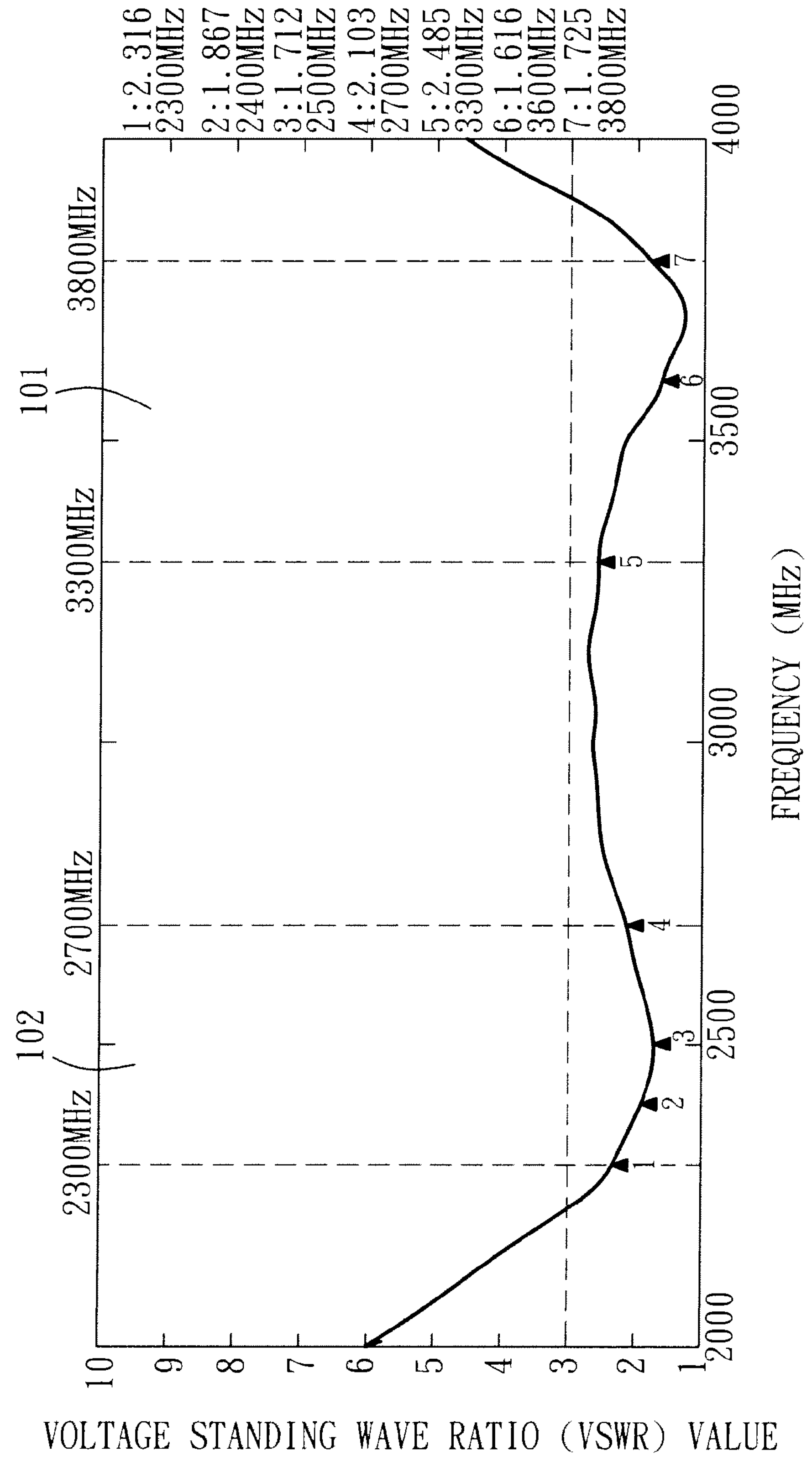
FIGS. 6(*a*) and 6(*b*) are Voltage Standing Wave Ratio (VSWR) plots of the second and first radiators of the multi-band antenna, respectively.
Figure 6B:
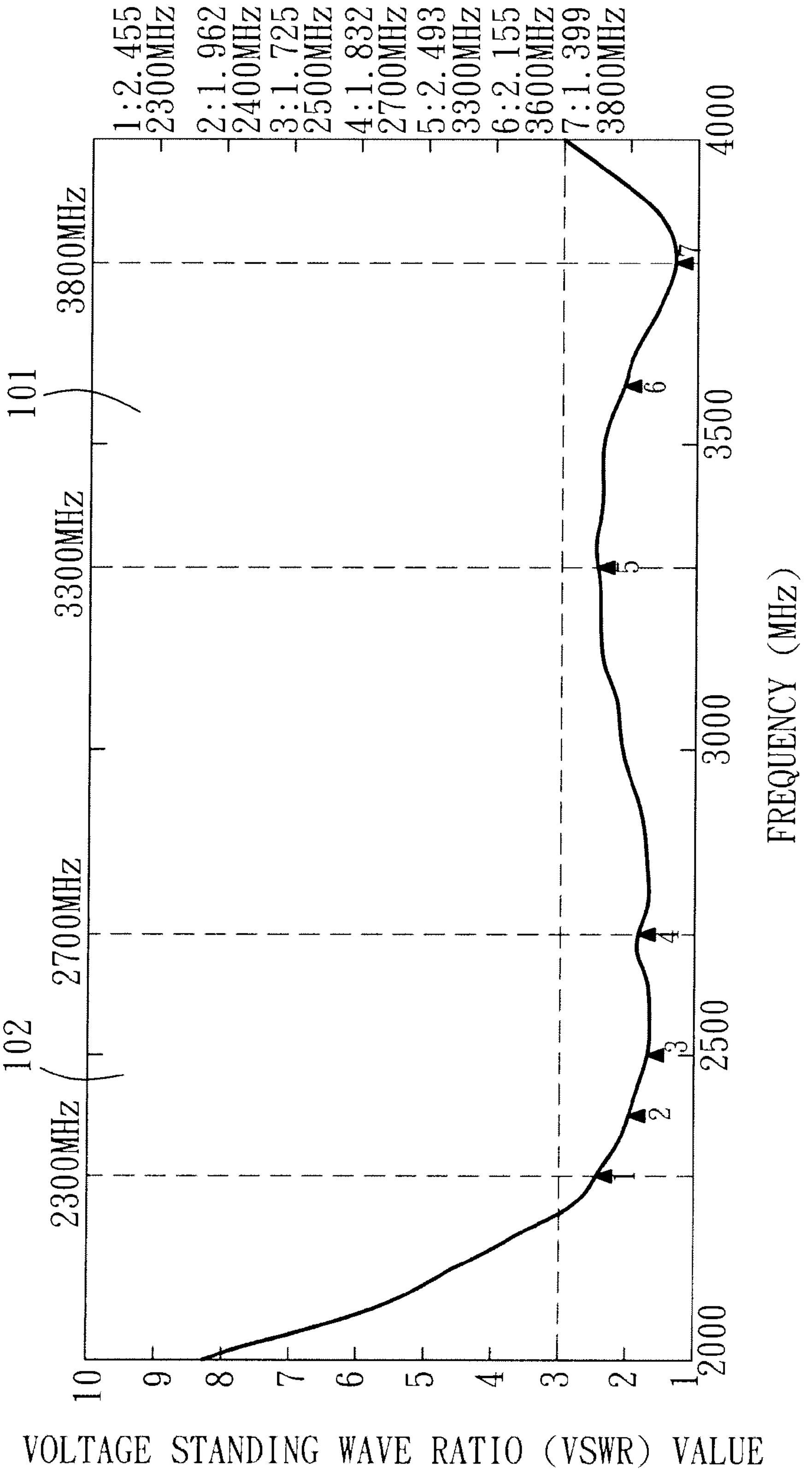

FIGS. 6(*a*) and 6(*b*) are Voltage Standing Wave Ratio (VSWR) plots of the second radiator 1' and the first radiator 1, respectively. It is apparent that the multi-band antenna 10 has VSWR values lower than 2.5 at frequencies ranging from 2.3 GHz to 2.7 GHz, and at frequencies ranging from 3.3 GHz to 3.8 GHz.

Referring to Tables 1 and 2, the second radiator 1' and the first radiator 1 have efficiencies higher than 35% (i.e., −4.56 dB) at frequencies within the first and second frequency bands 101, 102.

TABLE 1

| First radiator | | |
|---|---|---|
| Frequency (MHz) | Efficiency (dB) | Gain (dBi) |
| 2300 | −4.07 | −0.51 |
| 2350 | −3.15 | 1.02 |
| 2400 | −1.78 | 2.46 |
| 2500 | −2.34 | 2.75 |
| 2600 | −2.24 | 2.96 |
| 2700 | −2.94 | 2.34 |
| 3300 | −2.50 | 3.57 |
| 3600 | −1.68 | 3.74 |
| 3800 | −1.49 | 3.14 |

TABLE 2

| Second radiator | | |
|---|---|---|
| Frequency (MHz) | Efficiency (dB) | Gain (dBi) |
| 2300 | −4.29 | −0.58 |
| 2350 | −3.54 | −0.07 |
| 2400 | −2.61 | 0.7 |
| 2500 | −2.92 | 0.94 |
| 2600 | −2.39 | 1.79 |
| 2700 | −2.50 | 2.15 |
| 3300 | −1.83 | 3.33 |
| 3600 | −1.40 | 2.67 |
| 3800 | −0.48 | 3.60 |

Referring to Table 3, the first and second radiators 1, 1' have high isolations at frequencies within the first and second frequency bands 101, 102.

TABLE 3

| Multi-band antenna | |
|---|---|
| Frequency (MHz) | Isolation (dBi) |
| 2300 | −16.8 |
| 2350 | −15.4 |
| 2400 | −12.9 |
| 2500 | −11.5 |
| 2600 | −11.0 |
| 2700 | −11.1 |
| 3300 | −12.1 |
| 3600 | −15.4 |
| 3800 | −14.4 |

Figure 7A:
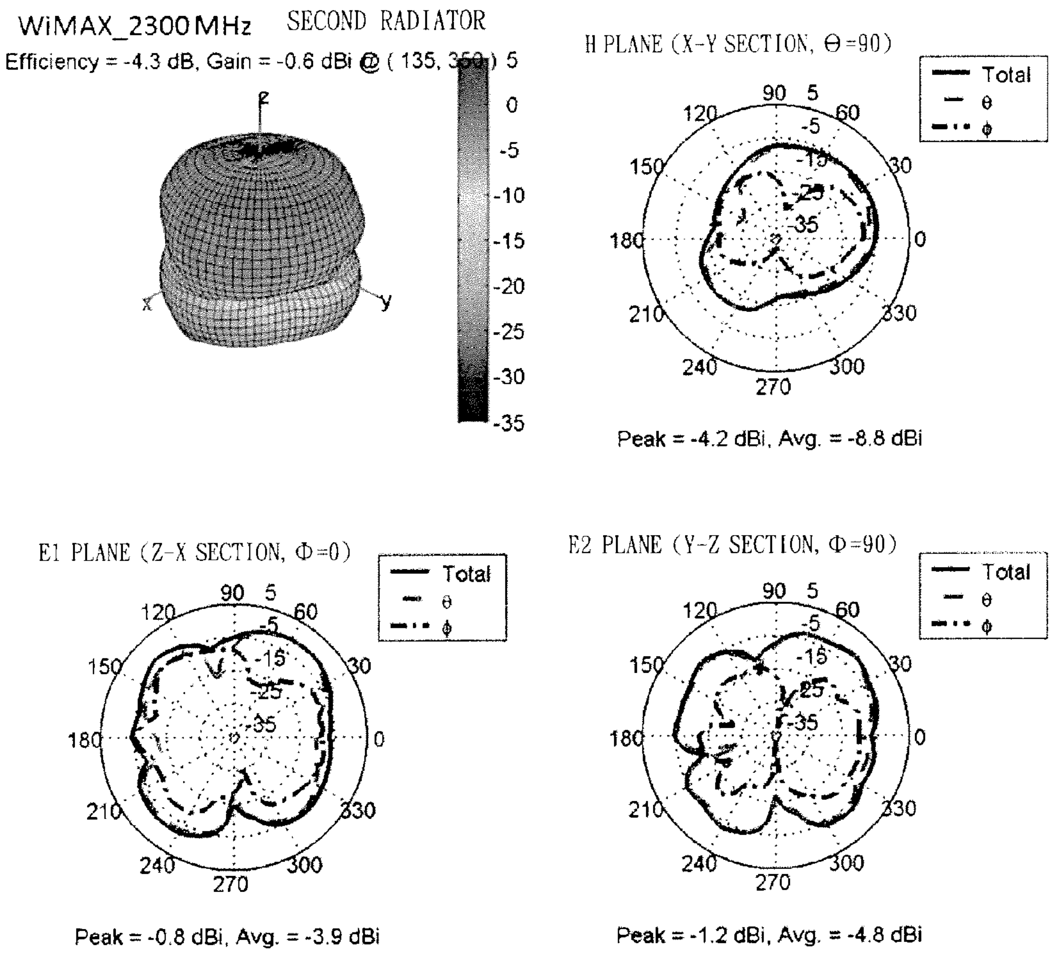
FIGS. 7(*a*) and 7(*b*) to FIGS. 15(*a*) and 15(*b*) illustrate radiation patterns of each of the first and second radiators of the multi-band antenna at frequencies of 2300 MHz, 2350 MHz, 2400 MHz, 2500 MHz, 2600 MHz, 2700 MHz, 3300 MHz, 3600 MHz, and 3800 MHz, respectively.
Figure 7B:
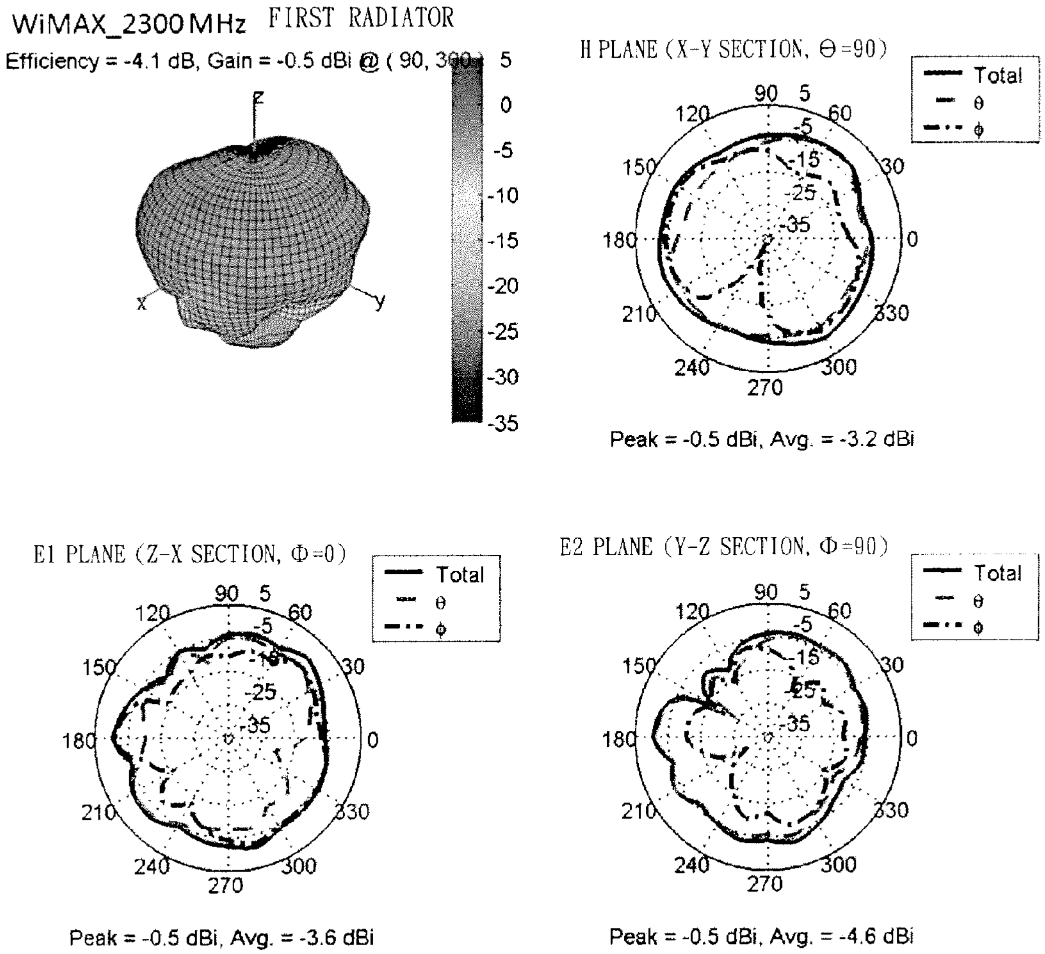
Figure 8A:
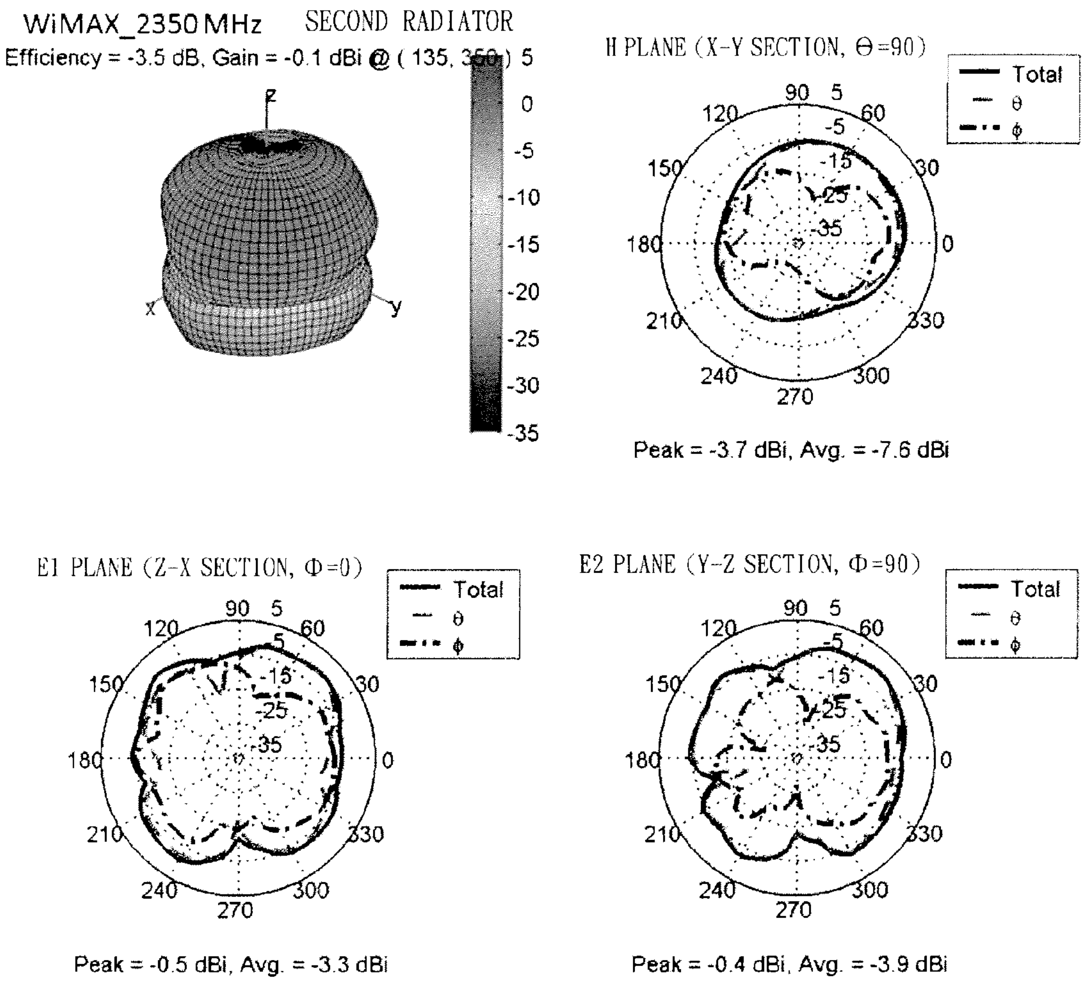
Figure 8B:
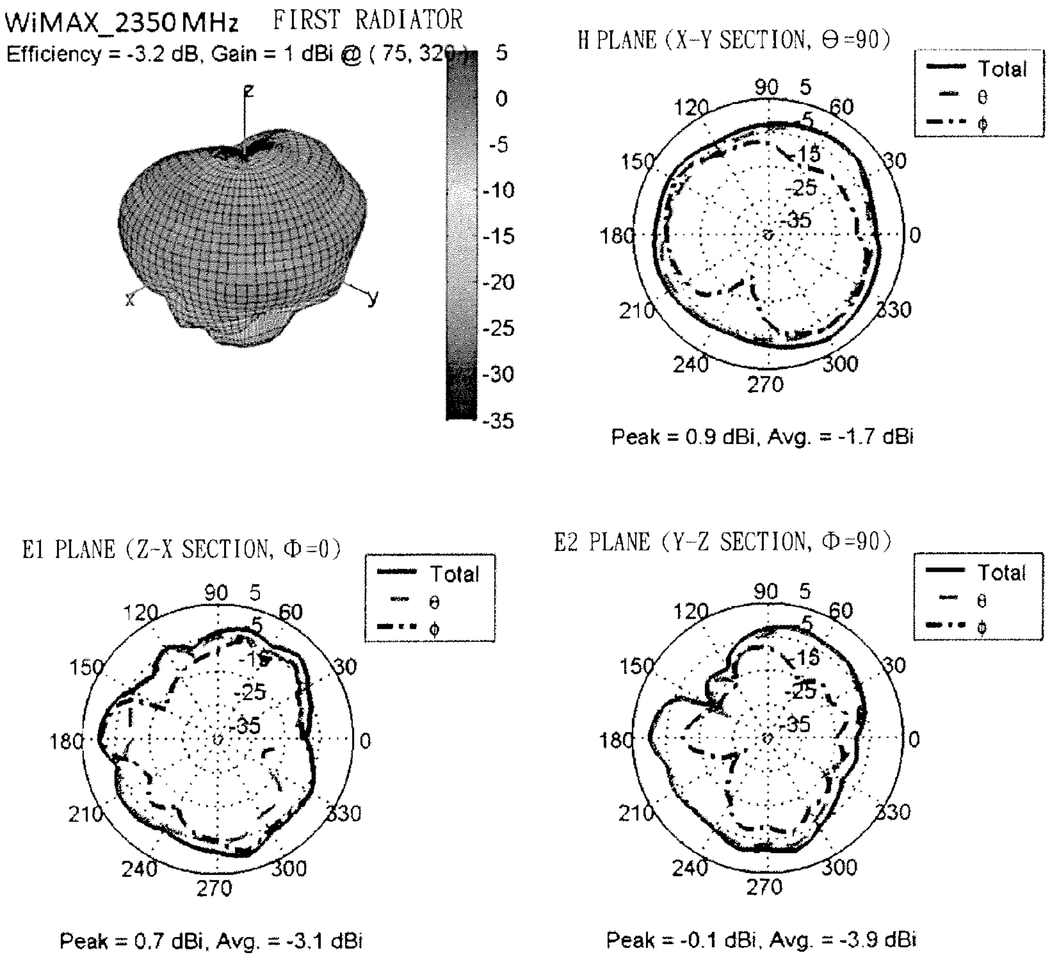
Figure 9A:
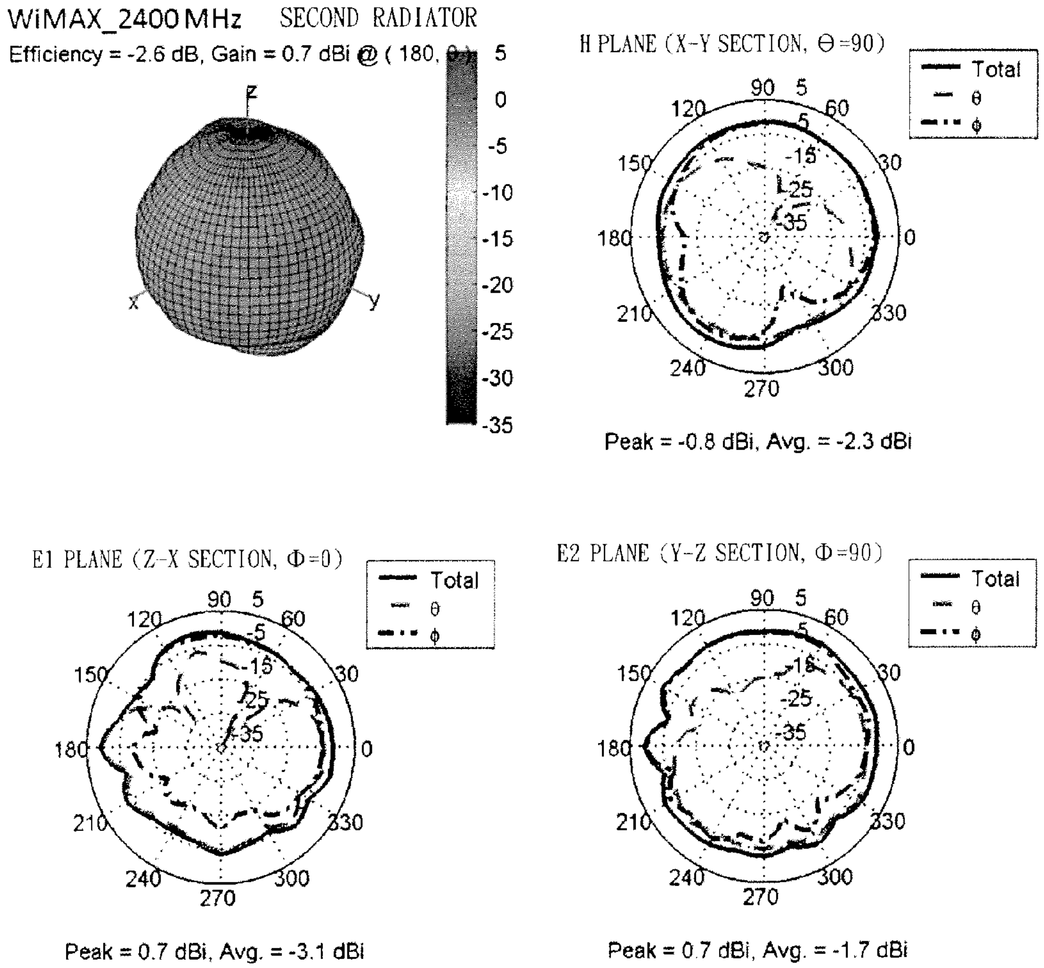
Figure 9B:
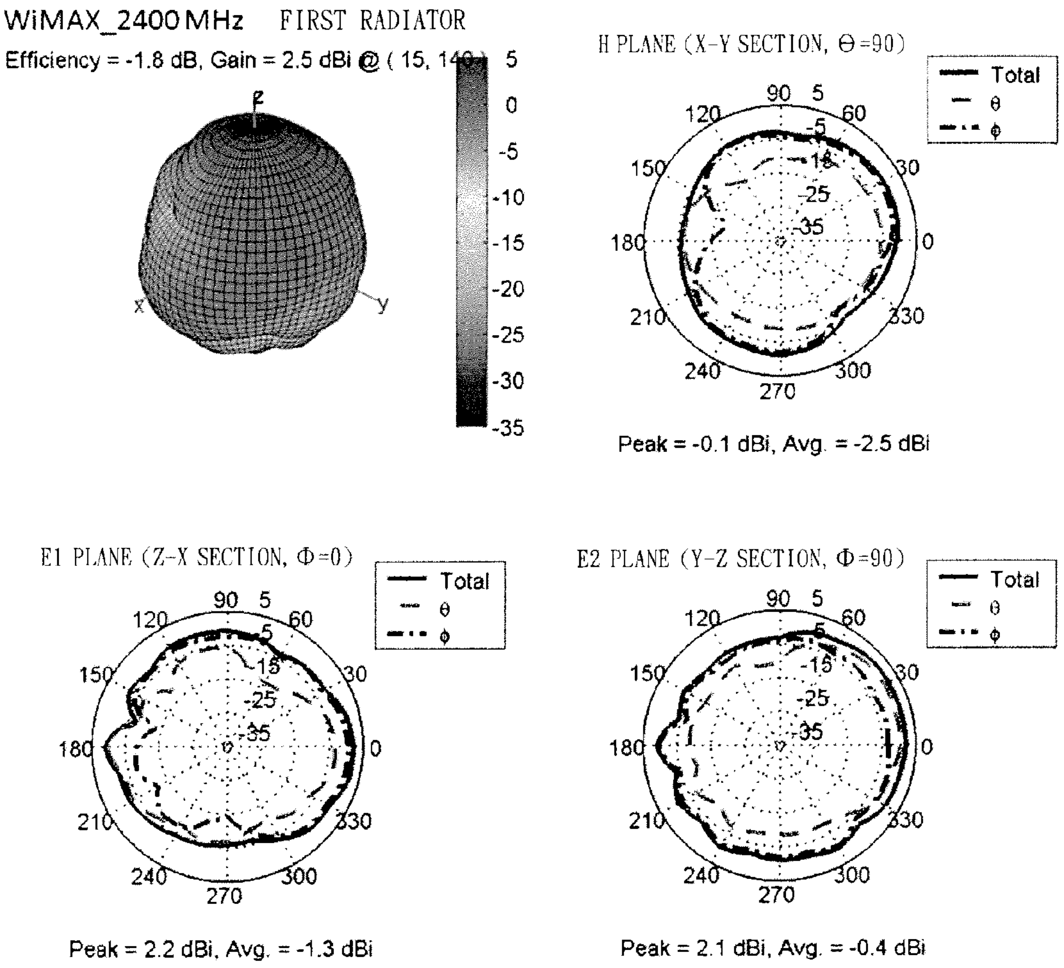
Figure 10A:
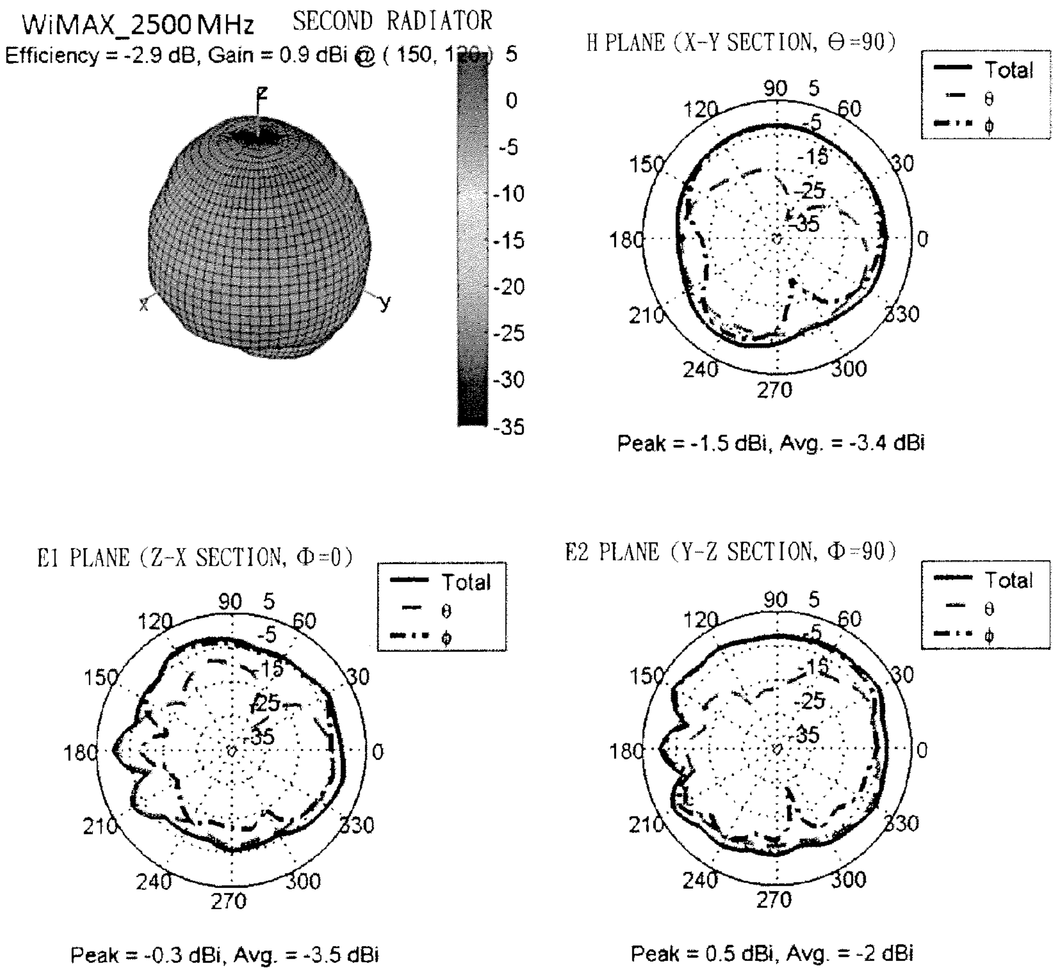
Figure 10B:
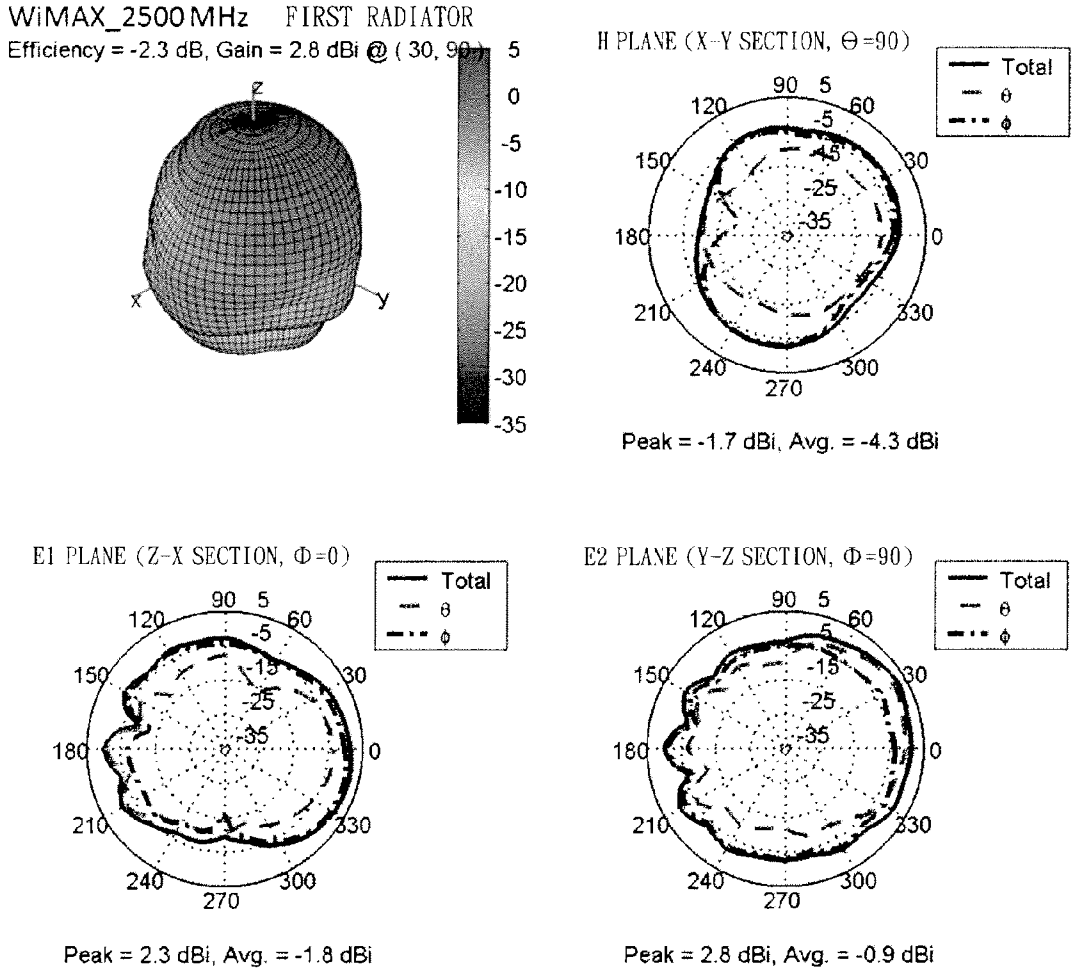
Figure 11A:
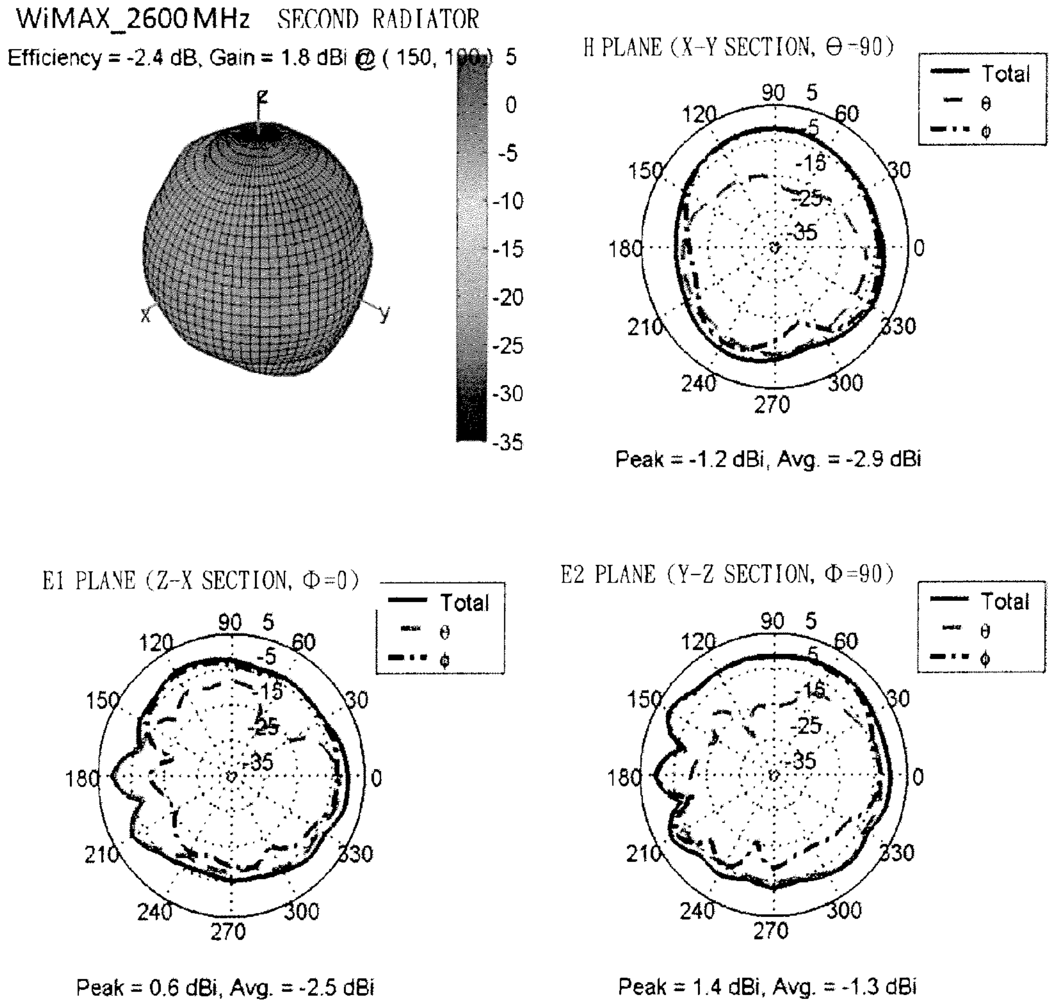
Figure 11B:
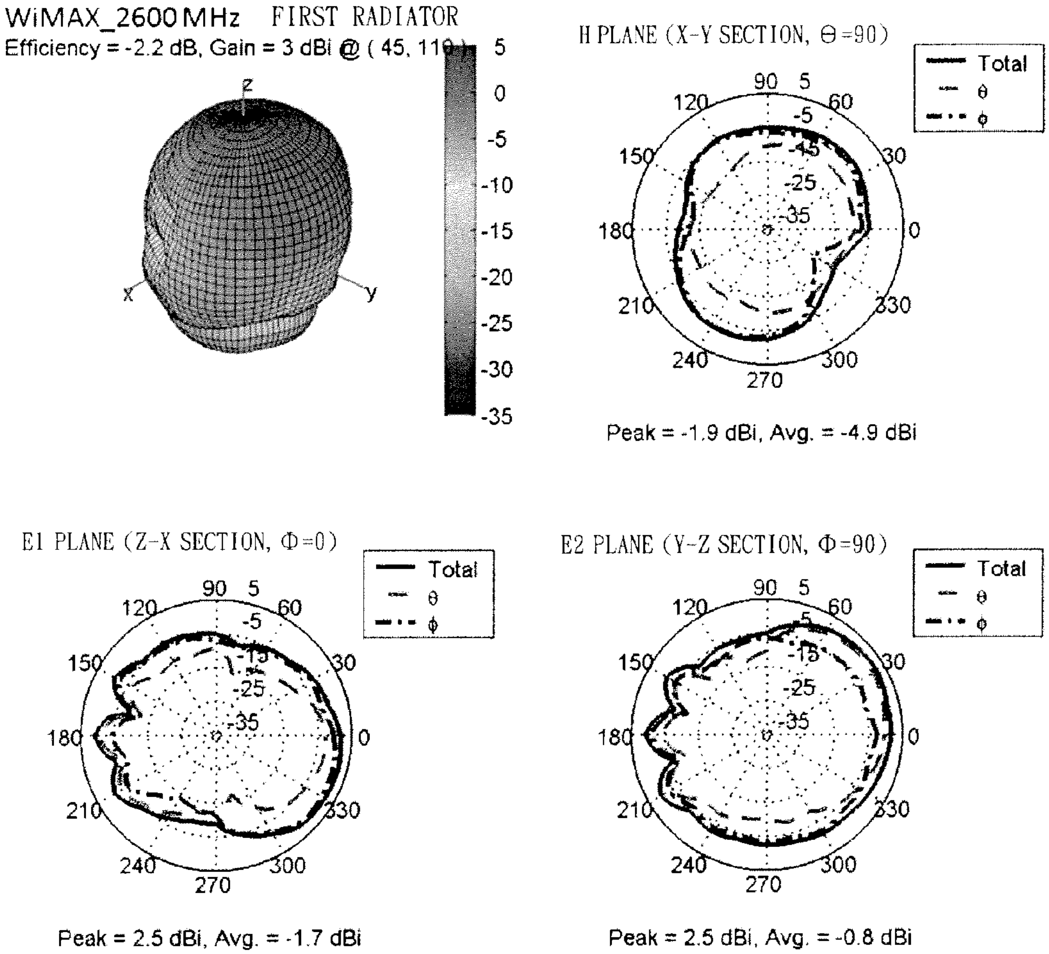
Figure 12A:
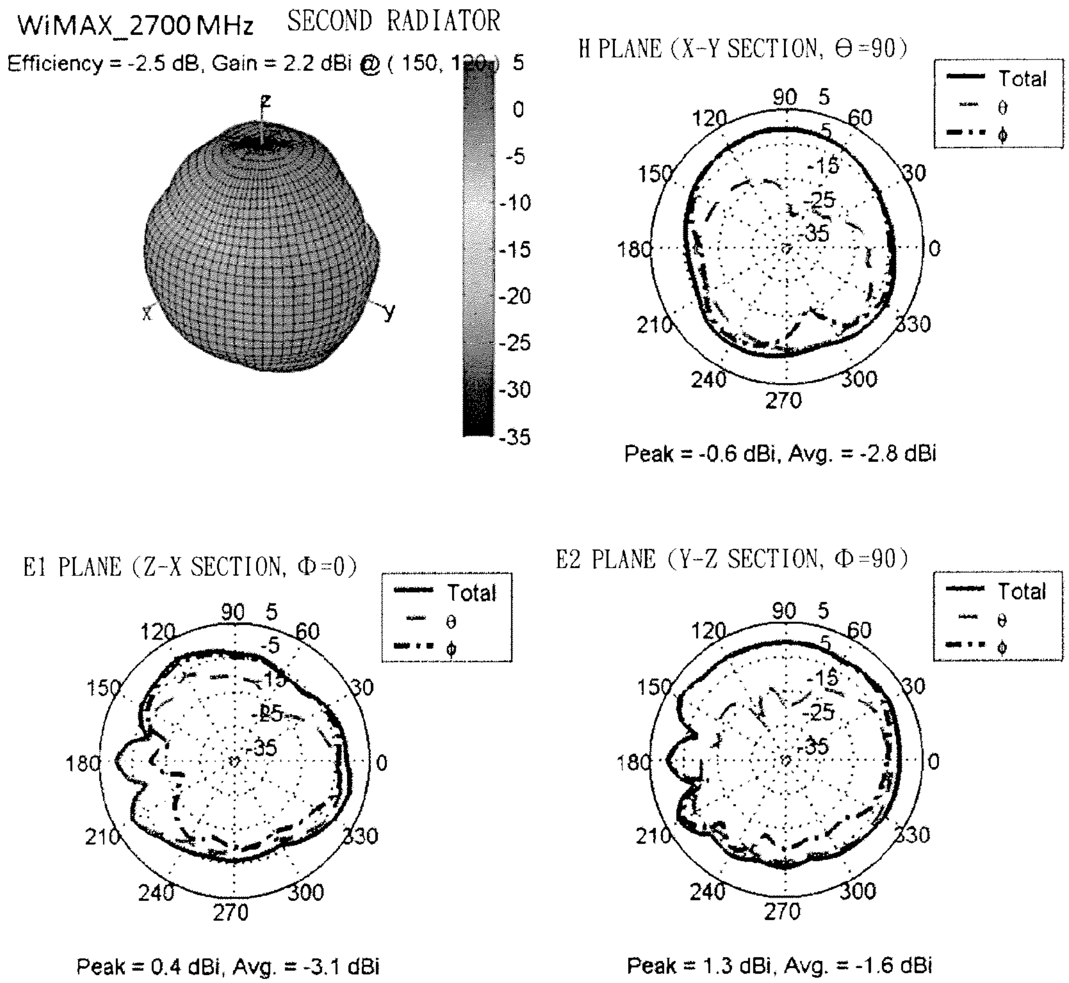
Figure 12B:
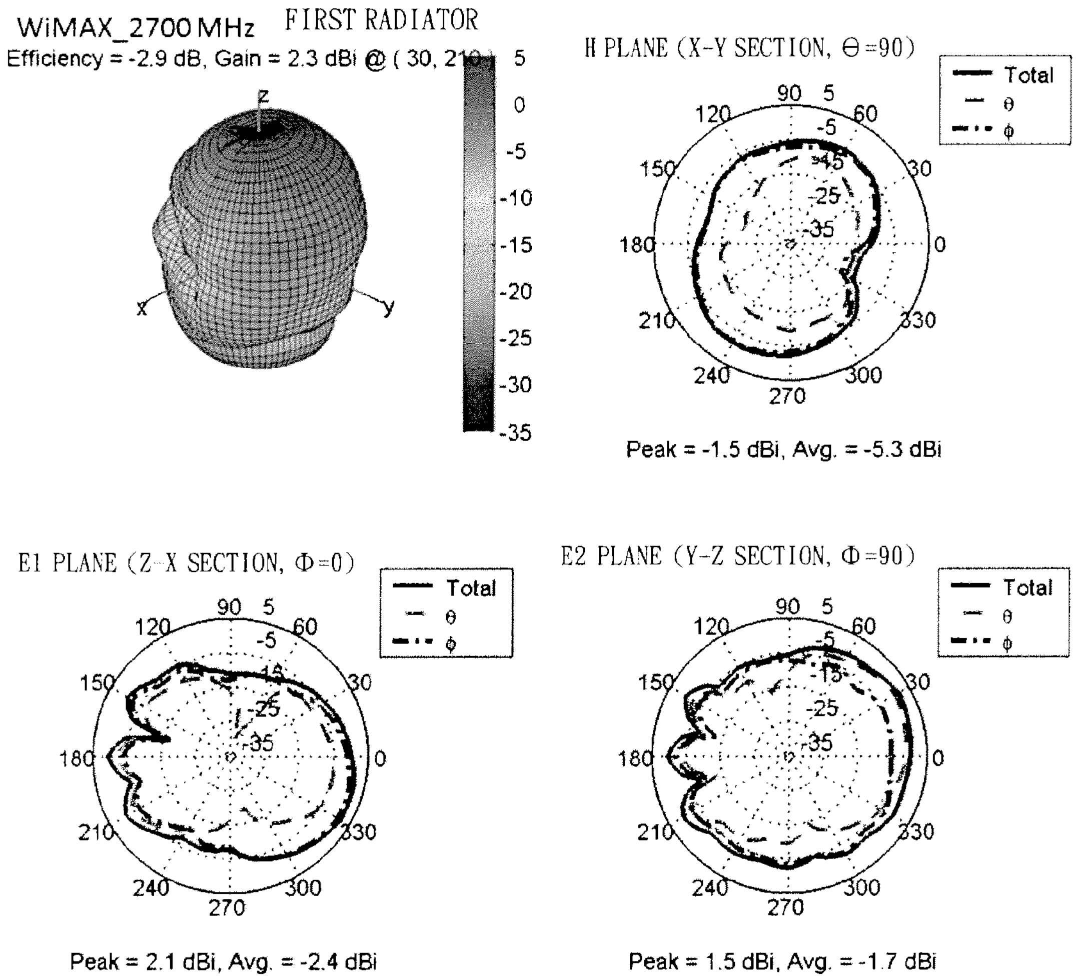
Figure 13A:
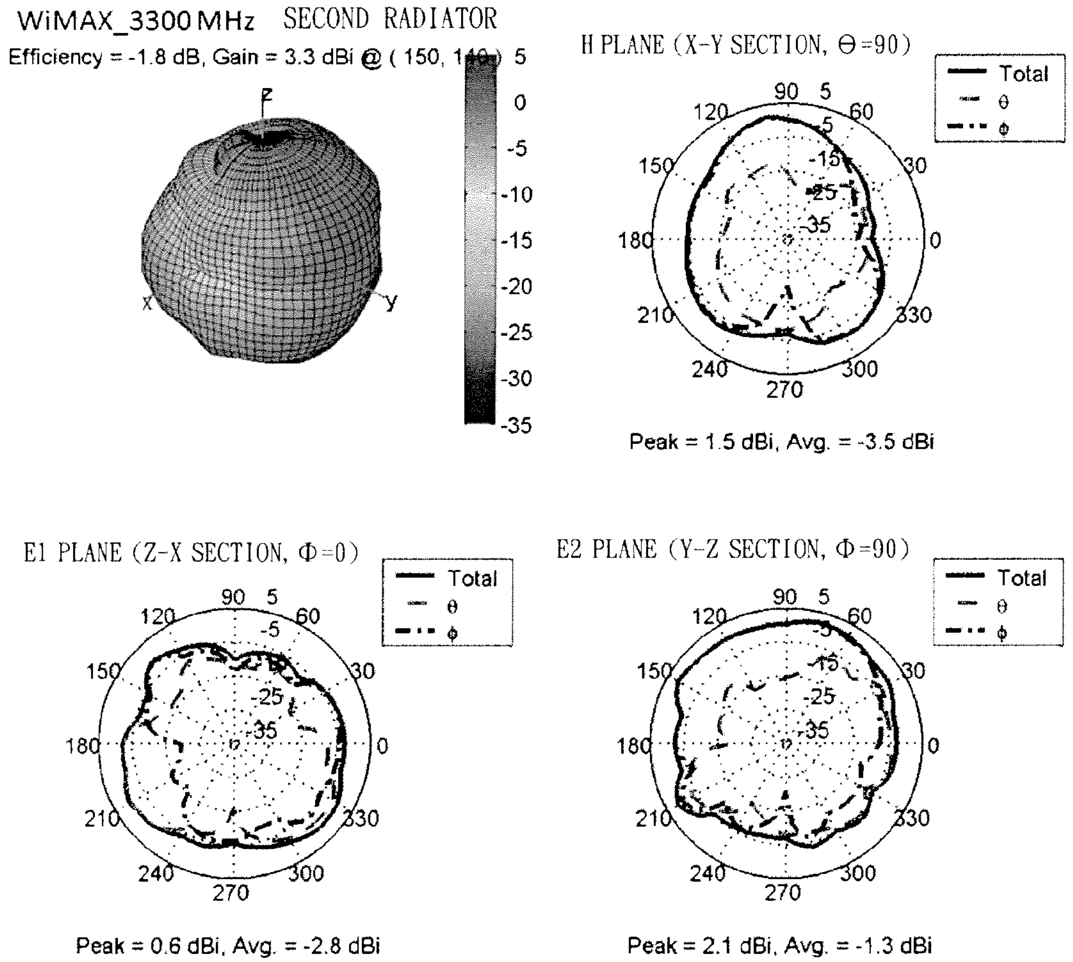
Figure 13B:
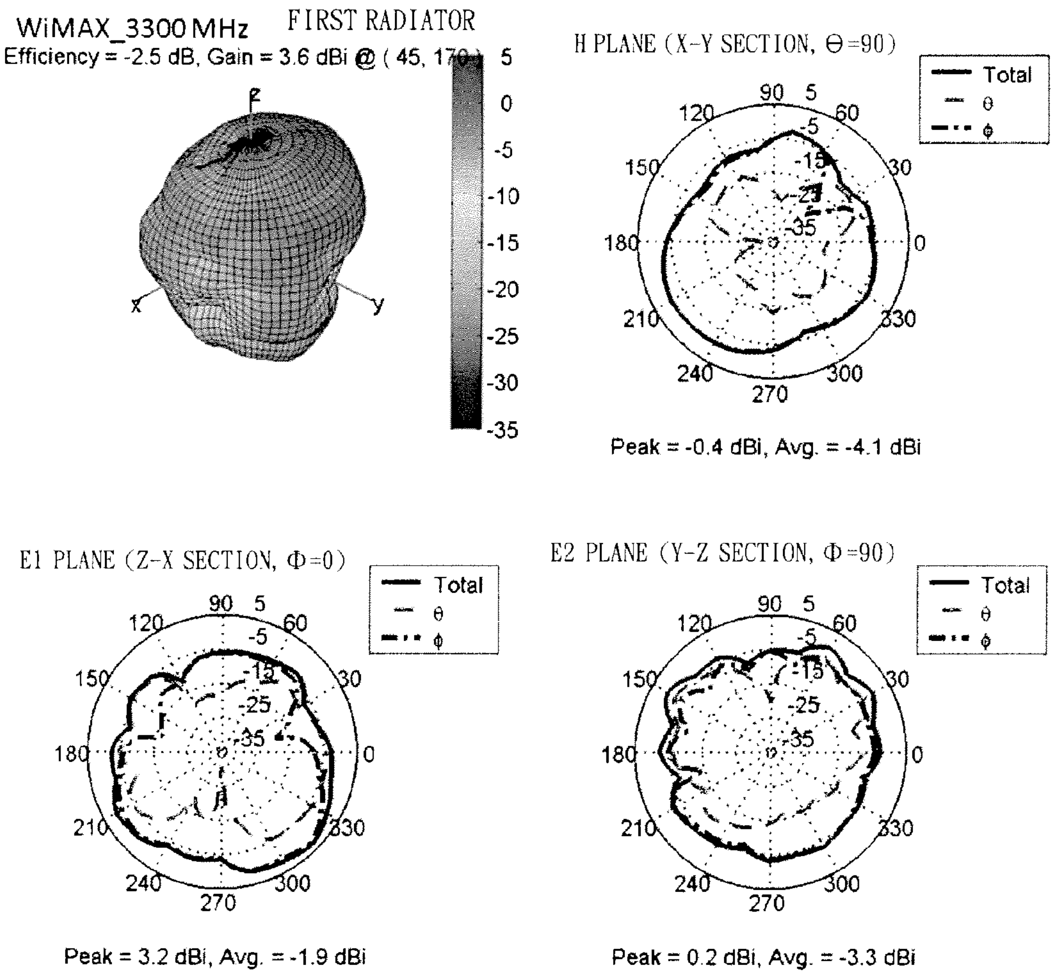
Figure 14A:
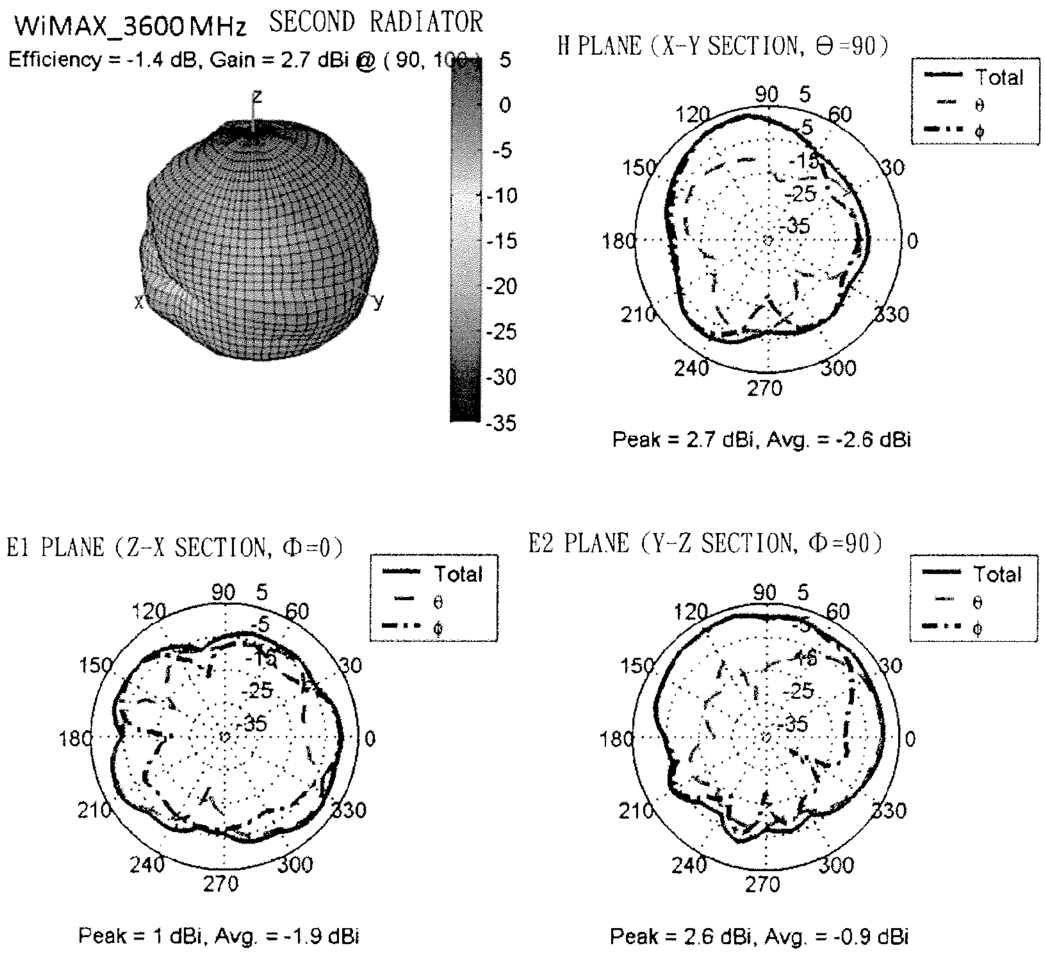
Figure 14B:
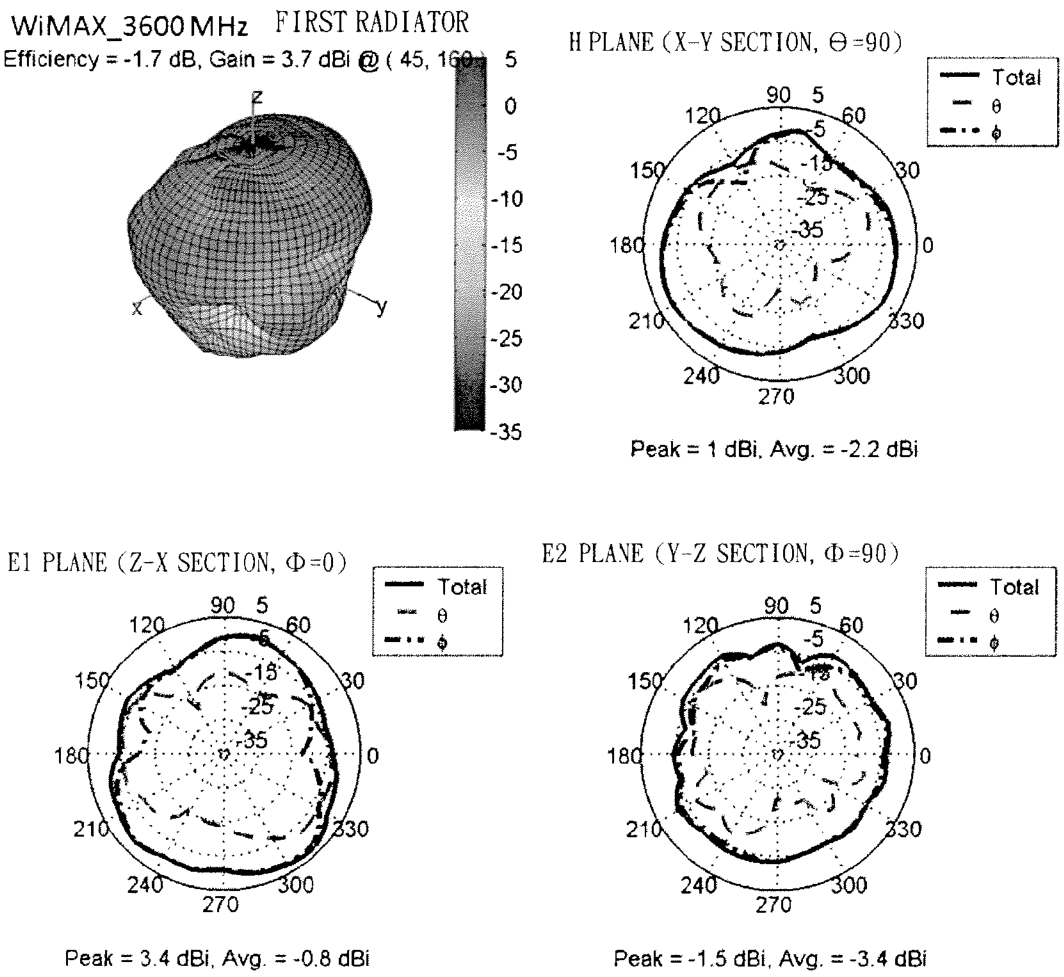
Figure 15A:
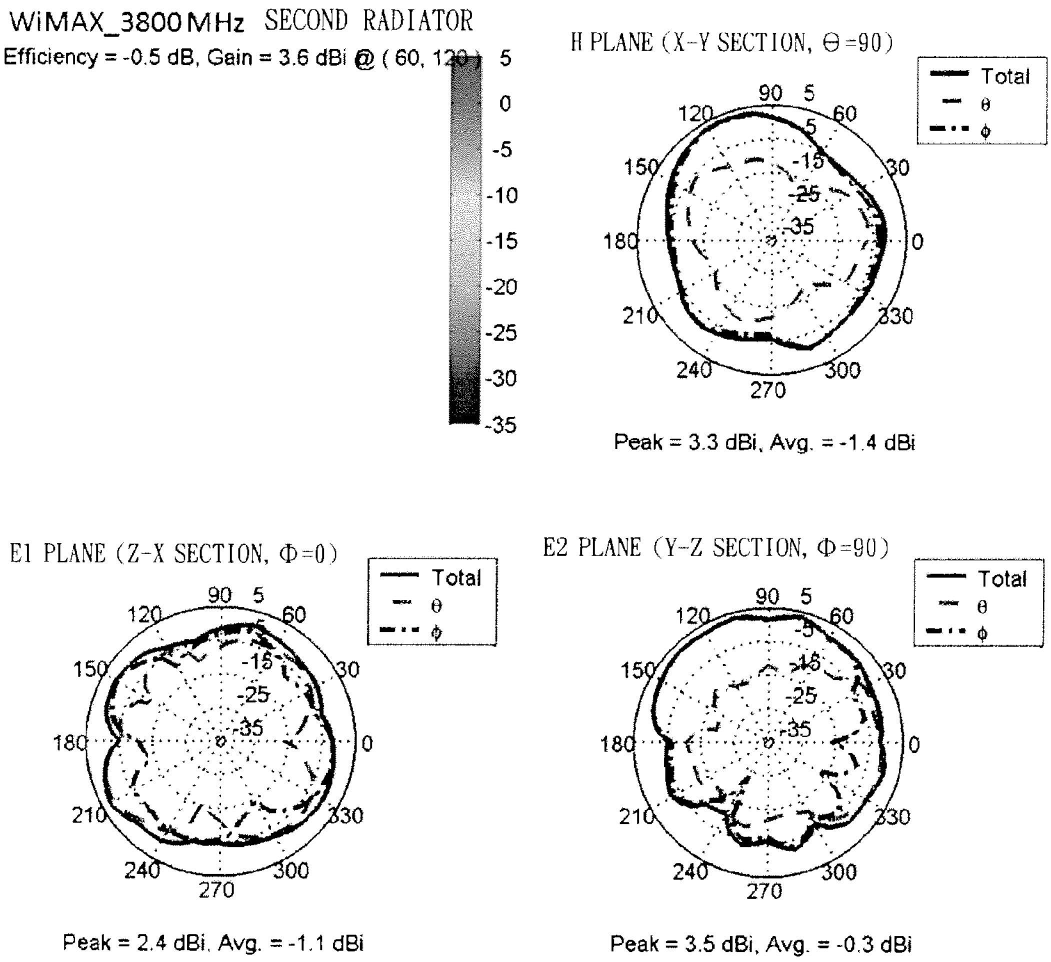
Figure 15B:
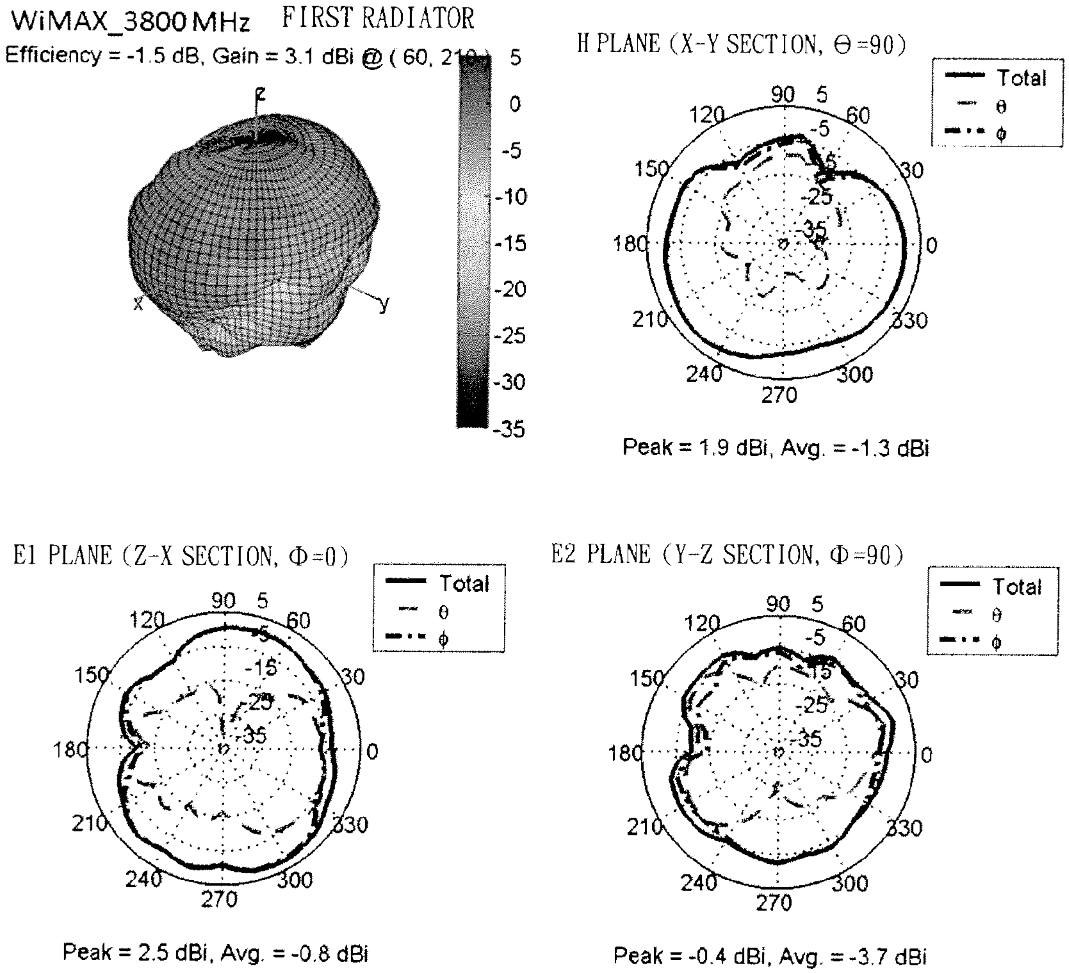

FIGS. 7(*a*) and 7(*b*) to FIGS. 15(*a*) and 15(*b*) show radiation patterns of each of the first and second radiators 1, 1' at frequencies of 2300 MHz, 2350 MHz, 2400 MHz, 2500 MHz, 2600 MHz, 2700 MHz, 3300 MHz, 3600 MHz, and 3800 MHz, respectively. It can be noted that radiation patterns of the first and second radiators 1, 1' of the multi-band antenna 10 are substantially omni-directional.

In summary, the multi-band antenna 10 of the preferred embodiment has relatively small dimensions, is adapted for disposing with front-end circuits (e.g., the transmitter and receiver circuits 61, 62, and the first and second matching circuits 63, 64) on a substrate, and hence is suitable for disposing in electronic devices with limited internal space. In addition, the multi-band antenna 10 may be conveniently configured for operating in the WLAN and WIMAX frequency bands.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A multi-band antenna adapted for disposing on a substrate with a ground plane and a matching circuit disposed thereon, said multi-band antenna comprising a first radiator, said first radiator including:

a feed-in section adapted to be connected electrically to the matching circuit;

a coupling section connected electrically to said feed-in section and adapted to be disposed spacedly from the ground plane;

a grounding section adapted to be connected electrically to the ground plane;

a multiple-bend arm connected electrically to said coupling section and said grounding section and cooperating with said grounding section to form a signal path for signals in a first frequency band; and a conductor section connected electrically to said multiple-bend arm and cooperating with a portion of said multiple-bend arm to form a signal path for signals in a second frequency band.

2. The multi-band antenna as claimed in claim 1, wherein said multiple-bend arm includes a first bent connecting section connected electrically to said grounding section, and a second bent connecting section interconnecting electrically said first bent connecting section and said coupling section, said conductor section being connected electrically to a junction of said first and second bent connecting sections, said grounding section cooperating with said first and second bent connecting sections to form the signal path for signals in the first frequency band, said conductor section cooperating with said second bent connecting section to form the signal path for signals in the second frequency band.

3. The multi-band antenna as claimed in claim 2, wherein said first bent connecting section has a first connecting segment, said second bent connecting section having a second connecting segment that is substantially parallel to said first connecting segment and that is spaced apart from said first connecting segment.

4. The multi-band antenna as claimed in claim 3, wherein at least one of said first and second bent connecting sections is substantially L-shaped.

5. The multi-band antenna as claimed in claim 3, wherein the first and second frequency bands are dependent upon a distance between said first and second connecting segments.

6. The multi-band antenna as claimed in claim 1, wherein the first and second frequency bands are dependent upon a length of said coupling section and a distance between said coupling section and the ground plane.

7. The multi-band antenna as claimed in claim 1, further comprising a second radiator that is adapted to be connected electrically to the ground plane and the matching circuit, and that is spaced apart from and that is a mirror image of said first radiator.

8. A communications device comprising:

a substrate with a ground plane and a matching circuit disposed thereon; and a multi-band antenna disposed on said substrate and including a first radiator, said first radiator including a feed-in section connected electrically to said matching circuit, a coupling section connected electrically to said feed-in section and disposed spacedly from said ground plane, a grounding section connected electrically to said ground plane, a multiple-bend arm connected electrically to said coupling section and said grounding section and cooperating with said grounding section to form a signal path for signals in a first frequency band, and a conductor section connected electrically to said multiple-bend arm and cooperating with a portion of said multiple-bend arm to form a signal path for signals in a second frequency band.

9. The communications device as claimed in claim 8, wherein said multiple-bend arm includes a first bent connecting section connected electrically to said grounding section, and a second bent connecting section interconnecting electrically said first bent connecting section and said coupling section, said conductor section being connected electrically to a junction of said first and second bent connecting sections, said grounding section cooperating with said first and second bent connecting sections to form the signal path for signals in the first frequency band, said conductor section cooperating with said second bent connecting section to form the signal path for signals in the second frequency band.

10. The communications device as claimed in claim 9, wherein said first bent connecting section has a first connecting segment, said second bent connecting section having a second connecting segment that is substantially parallel to said first connecting segment and that is spaced apart from said first connecting segment.

11. The communications device as claimed in claim 10, wherein at least one of said first and second bent connecting sections is substantially L-shaped.

12. The communications device as claimed in claim 11, wherein the first and second frequency bands are dependent upon a distance between said first and second connecting segments.

13. The communications device as claimed in claim 8, wherein the first and second frequency bands are dependent upon a length of said coupling section and a distance between said coupling section and said ground plane.

14. The communications device as claimed in claim 8, wherein said multi-band antenna further includes a second radiator that is connected electrically to said matching circuit and said ground plane, and that is spaced apart from and that is a mirror image of said first radiator.

15. The communications device as claimed in claim 8, further comprising at least one of a transmitter circuit and a receiver circuit connected electrically to said multi-band antenna.

16. The communications device as claimed in claim 15, wherein said at least one of said transmitter circuit and said receiver circuit is configured to process a wireless signal within wireless data transmission operating frequency bands associated with a wireless local area network standard and a worldwide interoperability for microwave access standard.

17. A USB wireless network card comprising:

a substrate with a ground plane and a matching circuit disposed thereon; and a multi-band antenna disposed on said substrate and including a feed-in section connected electrically to said matching circuit, a coupling section connected electrically to said feed-in section and disposed spacedly from said ground plane, a grounding section connected electrically to said ground plane, a multiple-bend arm connected electrically to said coupling section and said grounding section and cooperating with said grounding section to form a signal path for signals in a first frequency band, and a conductor section connected electrically to said multiple-bend arm and cooperating with a portion of said multiple-bend arm to form a signal path for signals in a second frequency band.

18. The USB wireless network card as claimed in claim 17, further comprising at least one of a transmitter circuit and a receiver circuit connected electrically to said multi-band antenna.

19. The USB wireless network card as claimed in claim 18, wherein said at least one of said transmitter circuit and said receiver circuit is configured to process a wireless signal within wireless data transmission operating frequency bands associated with a wireless local area network standard and a worldwide interoperability for microwave access standard.

* * * * *